Jan. 11, 1944.   P. M. HARDWICK   2,338,716
SWIVEL COUPLING
Filed July 6, 1942   2 Sheets-Sheet 1

INVENTOR
Pierre M. Hardwick
BY
Augustus B. Stoughton
ATTORNEY.

WITNESS:
Robt. P. Kitchel.

Jan. 11, 1944.　　　P. M. HARDWICK　　　2,338,716
SWIVEL COUPLING
Filed July 6, 1942　　　2 Sheets-Sheet 2

INVENTOR
Pierre M. Hardwick
BY
Augustus B. Stoughton
ATTORNEY.

WITNESS:

Patented Jan. 11, 1944

2,338,716

UNITED STATES PATENT OFFICE 2,338,716

SWIVEL COUPLING

Pierre M. Hardwick, Altadena, Calif.

Application July 6, 1942, Serial No. 449,847

3 Claims. (Cl. 285—97.9)

The principal object of the present invention is to provide a compact swivel coupling offering little or no appreciable resistance to flow, requiring the exertion of very little force for effectuating turning movement and substantially devoid of leakage even under relatively high air pressure; another object of the invention is to provide a device of the character indicated which, for example, at 150 lbs. per square inch air pressure, swivels freely enough to relieve a ½" x 3 braid air hose from twists with no turning force other than that exerted by the hose.

Other objects of the invention will appear from the following description at the end of which the invention will be claimed.

The invention comprises the improvements to be presently described and finally claimed.

Figure 1:
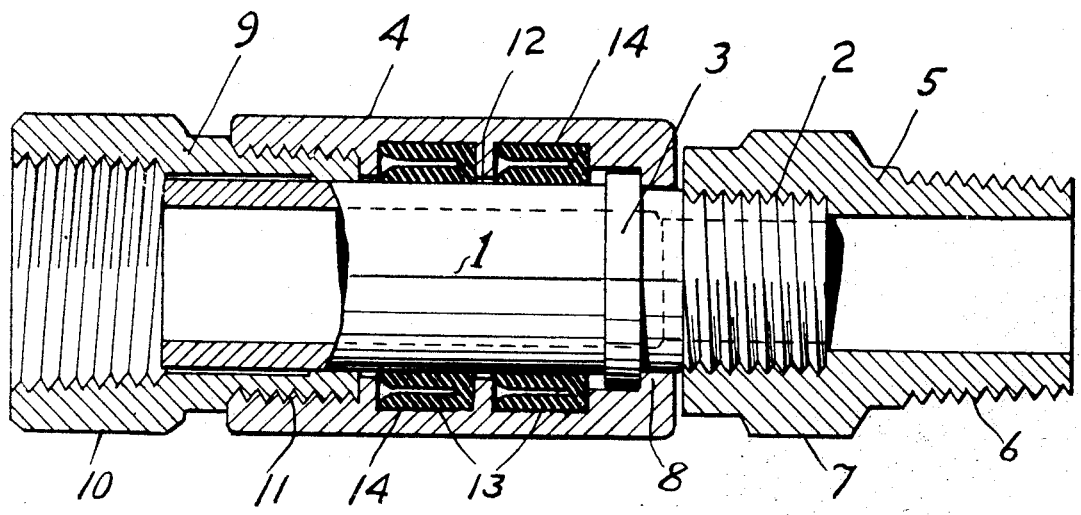
Figure 2:
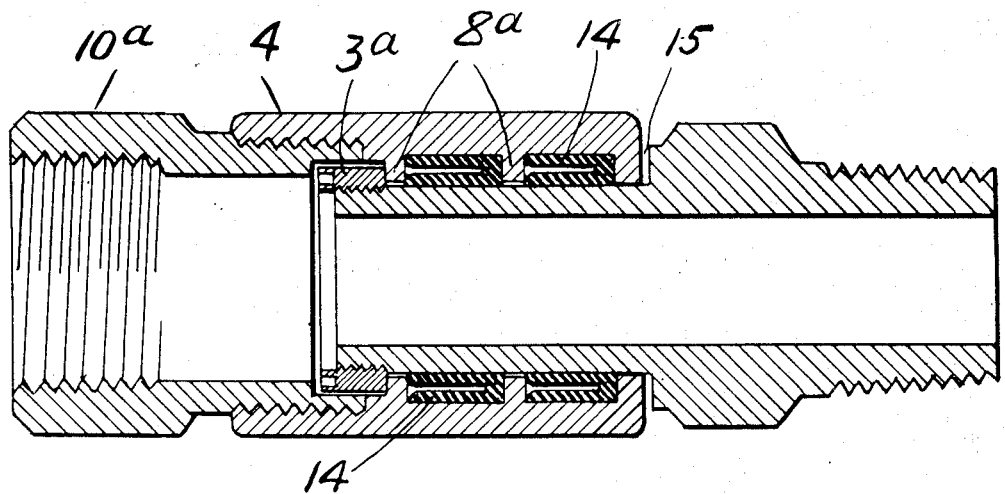
Figure 3:
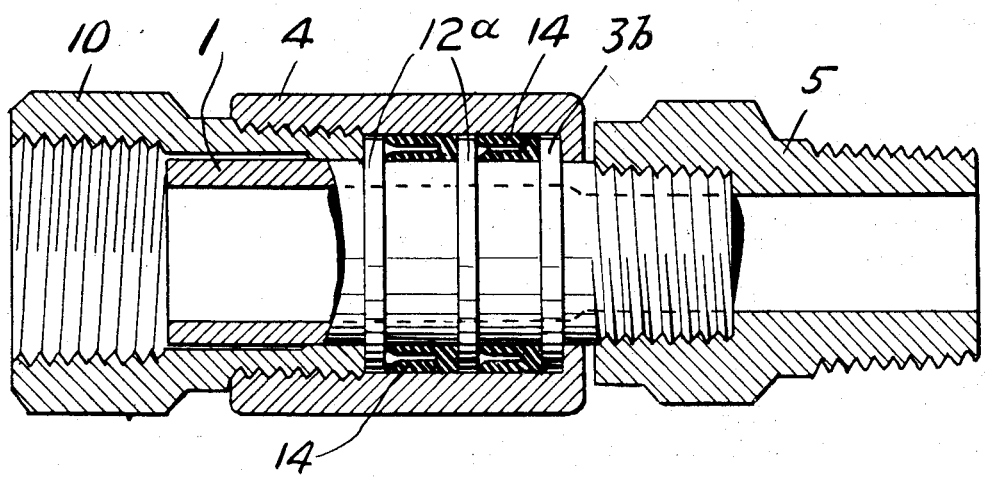

In the following description reference will be made to the accompanying drawings forming part hereof and in which, Figs. 1, 2 and 3 are side views with parts broken away.

The first figure is a longitudinal central section of a swivel coupling embodying features of the invention.

Referring to Fig. 1, 1 is a tubular stem externally threaded at one end as at 2 and having an external annular collar 3 located comparatively near the threaded end 2. 4 is a sleeve encircling the stem and mounted on the collar and stopping in proximity with the threaded portion 2 of the stem. 5 is a coupling element having an externally threaded shank 6 and an externally squared and internally threaded head mounted on the externally threaded end 2 of the stem and contacting with the inwardly directed flange 8 on the sleeve and removable and replaceable for assembly and disassembly. A second coupling element 9 has an internally threaded externally squared head 10 and a tubular shank 11 arranged in the internally threaded end of the sleeve and turnable on the stem. The intermediate portion of the internal surface of the sleeve is internally ribbed as at 12 and grooved as at 13. 14 indicates packing arranged in the grooves between the ribs and it is operatively arranged in respect to the stem. Two packing rings are shown but the number is not important. The packing rings shown each comprise a ring band folded upon itself along the middle but other forms of packing may be used. It may be remarked that as shown the packing ring is not subject to gland pressure and its friction in respect to the stem is, therefore, relatively slight. Furthermore, considering the sleeve and the coupling element 10 as a unit, the sleeve turns and has a bearing at spaced points on the stem or more accurately on the collar 3 and on the left hand end in the drawings. The sleeve construction and the stem construction turn very readily in respect to each other and the collar is not subjected to applied end pressure. The sleeve and the stem elements may be readily assembled and disassembled by removal of the coupling elements 10 and 7.

While the described swivel is not limited in its application still it is especially adapted for use in a compressed air line. For that purpose the coupling element 10 may be applied to a suitable compressed air outlet and the other coupling element may be applied to an air hose. It may be remarked that the internal diameter or bore of the swiveling coupling is substantially uniform throughout the length of the stem and is not contracted at other portions of the device.

If a hose attached to the swivel is twisted at a distance of some twelve or fourteen feet from the swivel the swivel turns, and if the hose is twisted perhaps twenty-five feet away from the swivel, the swivel spins around and relieves the twisting if the hose is shaken or whipped. If the hose is carried around a corner and twisted the swivel spins around when the hose is whipped indicating that the swivel offers little or no resistance to turning movement and is comparatively free from internal friction.

The described device is a help to hose users particularly on air hose where the operator moves around with the pneumatic tool and tends eventually to get the hose full of loops and kinks and has to stop work and disconnect the hose and straighten it out. Contrary to this and with the described swivel, most of the twist automatically frees itself at the swivel with no attention from the operator and any twisting that might accumulate when the hose is slack can be easily freed by shaking the hose once or twice.

From the foregoing description it is evident that the device consists only in effect of four pieces, the stem and its coupling element and the sleeve and its coupling element, omitting reference to packing. The device, therefore, consisting of these few parts, is comparatively simple and inexpensive to manufacture.

In Figure 2 the collar 3ª is arranged near the inner end of the stem and is in the form of a circular screw nut provided with spanner slots and it bears on the inwardly directed flange 8ª on the sleeve. The coupling element 10ª is located close enough to the collar 3ª to oppose its disengagement from the stem. There is clearance at 15.

In Figure 3 the ribs 12ᵃ are on the stem and they are symmetrical with the collar 3ᵇ.

The construction and mode of operation of the modification shown in Figs. 2 and 3 are as has been described in connection with Figure 1 except as noted in the immediately preceding two paragraphs.

It will be obvious to those skilled in the art to which the invention relates that modifications may be made in details of construction and arrangement without departing from the spirit of the invention which is not limited as to such matters or as to matters of mere form.

I claim:

1. In a swivel comprising a tubular stem having at one end a coupling element and having intermediate of its ends an external collar, a sleeve mounted on the stem for turning movement and having an inwardly directed flange arranged to engage the collar for twisting movement and for opposing endwise movement, a second coupling element threaded into the sleeve and constructed for turning movement in respect to the stem, the improvement which consists in a groove provided in the inner surface of the sleeve and having its three bounding walls integral with the sleeve and permanently fixed and immovable in respect to each other, and a ring of solid packing arranged in the groove in contact with its three walls and cooperating with the outside surface of the stem, the friction between the ring and the three walls of the groove exceeding the friction between the packing and the surface of the stem, whereby the packing is held against rotation in respect to the sleeve and is free from gland pressure.

2. A swivel comprising a tubular stem having intermediate of its ends an external collar, a coupling element screw threaded onto one end of the stem, a sleeve mounted on the collar and having an inturned end flange arranged between the collar and the end of the coupling element for twisting movement, a second coupling element threaded into the sleeve and mounted on the stem for turning movement, and a ring packing arranged in a groove provided in the inner surface of the sleeve and cooperating with the outside surface of the stem and free from gland pressure.

3. A swivel comprising a tubular stem externally threaded at one end and having an external annular collar located comparatively near the threaded end, a sleeve surrounding the stem and mounted on the collar and stopping in proximity with the threaded portion of the stem and having an inwardly directed flange overlapping the outer face of the collar, a coupling element having an externally threaded shank and an externally squared and internally threaded head mounted on the externally threaded end of the stem and contacting the inwardly directed flange of the sleeve and removable and replaceable for assembly and disassembly, a second coupling element having an internally threaded externally squared head and an externally threaded tubular shank arranged in the internally threaded end of the sleeve, the intermediate portion of the internal surface of the sleeve being internally ribbed and grooved, and ring packing comprising a ring band folded upon itself along the middle and mounted at the ribbed and grooved portion of the inner surface of the sleeve and operatively arranged in respect to the stem.

PIERRE M. HARDWICK.